United States Patent [19]

Gris

[11] Patent Number: 5,036,661
[45] Date of Patent: Aug. 6, 1991

[54] REGULATED LEVEL ACCUMULATOR FOR LIQUID UNDER HIGH PRESSURE

[75] Inventor: Philippe Gris, Aubevoye, France

[73] Assignee: Societe Europeenne De Propulsion, Suresnes, France

[21] Appl. No.: 547,634

[22] Filed: Jul. 2, 1990

[30] Foreign Application Priority Data

Jul. 5, 1989 [FR] France ............................... 89 09060

[51] Int. Cl.⁵ ............................................. F16D 31/02
[52] U.S. Cl. ......................................... 60/415; 60/418
[58] Field of Search ................ 60/413, 415, 418, 416; 138/30; 137/393, 453, 386

[56] References Cited

U.S. PATENT DOCUMENTS

| | | | |
|---|---|---|---|
| 1,002,219 | 9/1911 | Burke | 137/393 |
| 2,207,527 | 7/1940 | Weber | 137/453 |
| 2,278,181 | 3/1942 | Lieberherr | 60/416 |
| 3,230,976 | 1/1966 | Mercier | 138/30 |
| 3,845,636 | 11/1974 | Van Mal | 62/55 |
| 3,858,404 | 1/1975 | Davis | 62/51 |
| 4,278,403 | 7/1981 | Shafer | 60/418 |

FOREIGN PATENT DOCUMENTS 0065847 12/1982 European Pat. Off.
0104041 6/1982 Japan ................... 137/393
575695 2/1946 United Kingdom.
610071 10/1948 United Kingdom.

Primary Examiner—Edward K. Look
Assistant Examiner—Hoang Nguyen
Attorney, Agent, or Firm—Weingarten, Schurgin, Gagnebin & Hayes

[57] ABSTRACT

The accumulator comprises a vessel which is in communication with a hydraulic circuit and which contains a liquid occupying a portion of the space inside the vessel. The level of the liquid contained in the vessel is regulated by controlling the volume of gas overlying the liquid. The regulation apparatus essentially comprise a calibrated injector device for injecting gas under pressure into a first cavity, and a mechanically controlled gas bleeder device in a second cavity separated from the first cavity by a partition having at least one calibrated orifice situtated in a zone which is safe from being submerged in the liquid, and an opening situated in the liquid level control zone and extending on either side of the level of the interface between the liquid and the gas. The gas bleeder device responds to the pressure difference between the first and second cavities and has a flow section which varies as a function of the change in liquid level, with a low gas flow rate being permanently maintained to the outside.

12 Claims, 2 Drawing Sheets

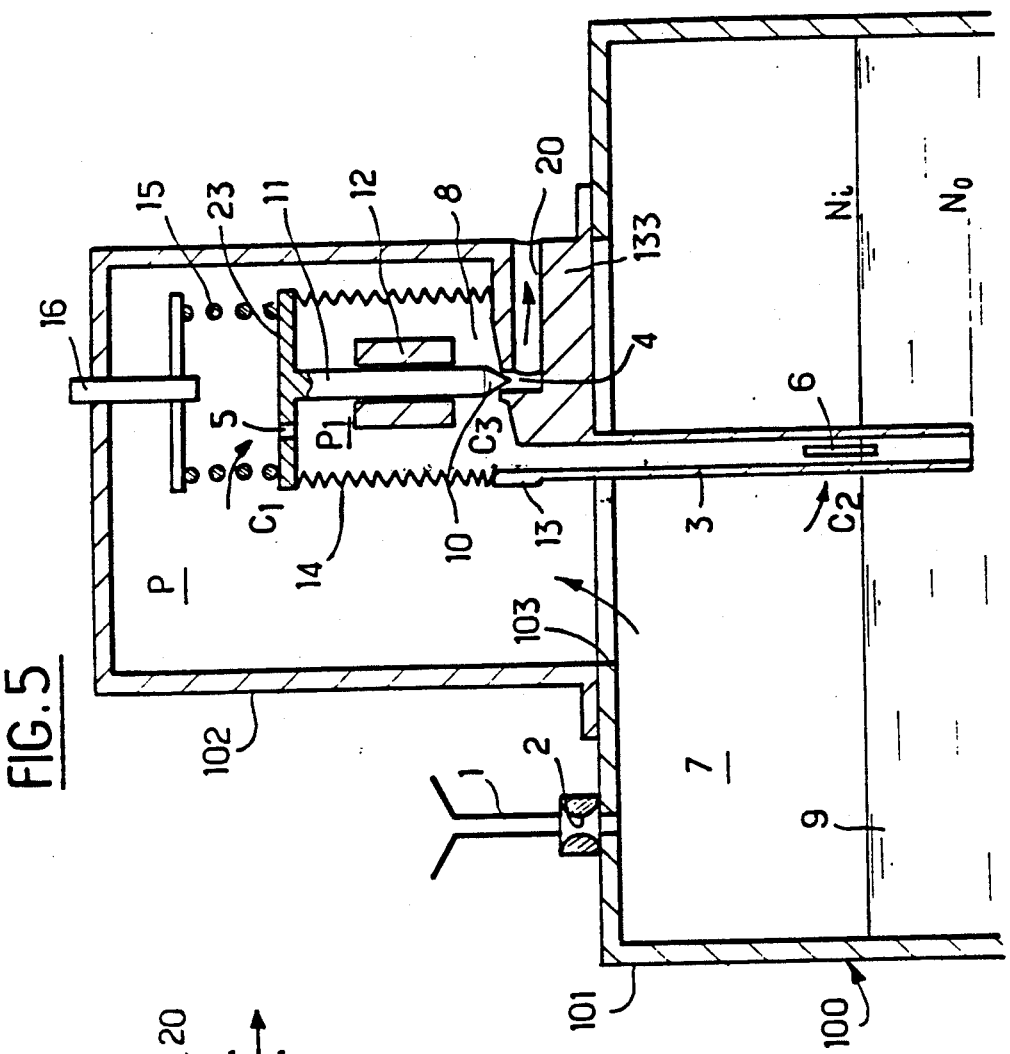
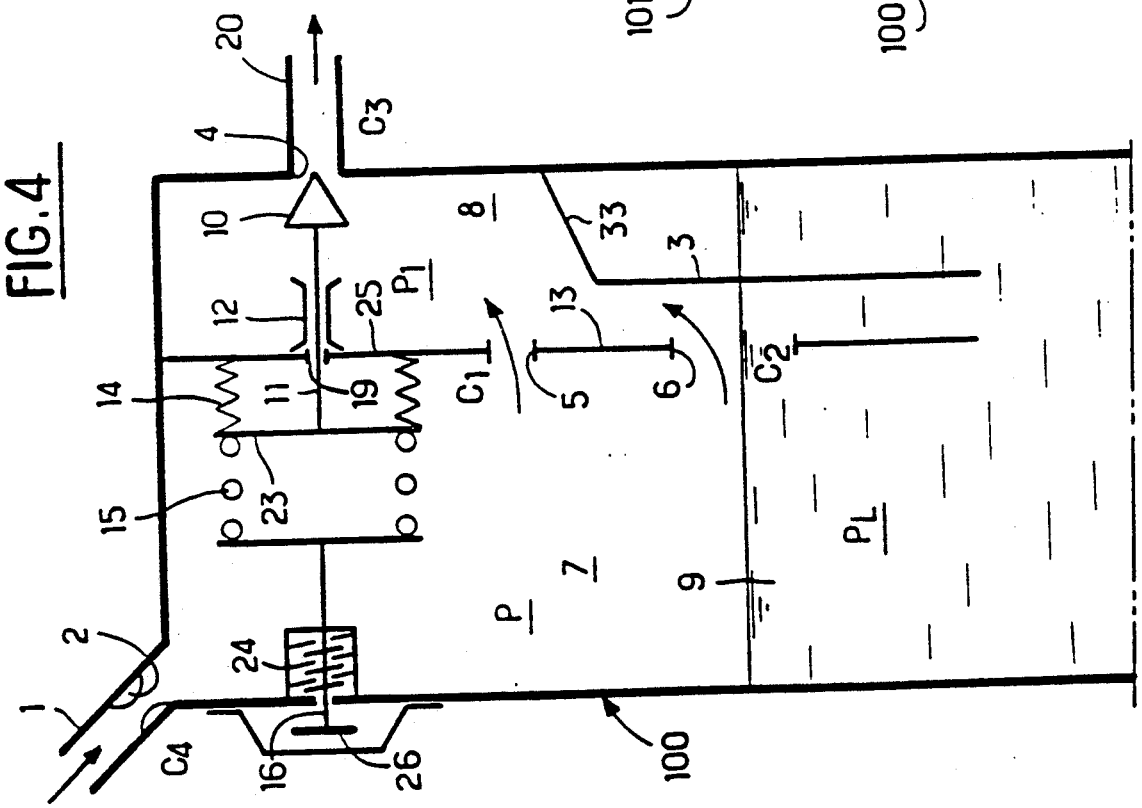

REGULATED LEVEL ACCUMULATOR FOR LIQUID UNDER HIGH PRESSURE

The present invention relates to a liquid accumulator for liquid under high pressure and at regulated level, the accumulator comprising a vessel which is in communication with a hydraulic circuit and which contains a liquid occupying a portion of the space inside the vessel, a gas injector device for injecting gas under pressure into the vessel, and a gas bleeder device for bleeding off gas present in the vessel, said bleeder device having a flow section whose value increases when the liquid level inside the vessel drops and decreases when the liquid level inside the vessel rises.

BACKGROUND OF THE INVENTION

Liquid accumulators have already been implemented comprising a vessel communicating with a hydraulic installation that may be under high pressure, the fluid contained in the vessel being partially liquid and partially gas. The liquid accumulator may co-operate with a system for controlling or regulating the level of liquid in the vessel. However, such a system for controlling or regulating the level of liquid requires level sensors to be used together with regulation circuits which are usually of the electronic type. This constitutes a major drawback for applications to systems conveying fluids which are toxic or corrosive, such as the fluids used in the nuclear and chemical industries, or in applications using fluids that are volatile, e.g. in a cryogenic stage of a satellite launcher.

The present invention seeks to remedy the drawbacks of the prior art and make it possible to provide an accumulator for liquid under high pressure and at regulated level without requiring the use of electrical type regulation circuits or sensors and which makes it possible to use purely mechanical means in simple and robust form for obtaining accurate, sensitive and stable regulation of the level of a liquid, over a wide range of pressures and without any risk of damaging the regulation system.

SUMMARY OF THE INVENTION

These objects are achieved by a liquid accumulator for liquid under high pressure and at regulated level of the type defined at the beginning of the description wherein:

the top portion of the space inside the vessel is subdivided into first and second cavities by a partition having at least one calibrated orifice provided through a zone of the partition which is not in danger of being submerged;

said partition is extended by a portion substantially perpendicular to the surface of the liquid and extending downwards into the liquid to a level No situated well below the minimum level to which the liquid may drop:

the extended portion of the separating partition possesses an opening in the liquid level control zone, the opening extending on either side of the level interface Ni between the liquid and the gas under pressure;

it includes means for maintaining the flow rate of the gas injected into the vessel by the pressurized gas injector device substantially constant;

the gas bleeder device comprises a valve seat co-operating with a valve member in the form of a needle whose position is adjusted by a moving comparator element constituting a portion of the partition and responding to the pressure difference $P-P1$ existing between the first and second cavities; and adjustment means are associated with the moving comparator element so as to ensure that under normal operating conditions for regulating the level of the liquid the valve member never comes into contact with its seat, thereby permanently maintaining a small flow of gas to the outside.

In such a liquid accumulator, the difference between the pressures in the two cavities remains low, thereby making it possible to operate over a wide range of absolute pressures without running the risk of damaging the comparator element, and also avoiding the phenomenon of liquid being sucked through the tube which would reduce accuracy, and preventing liquid being ejected to the outside which could be dangerous.

In addition, the substantially linear law relating gas ejection flow rate to the pressure difference between the two cavities contributes to obtaining accurate servo control.

The permanent flow of gas passing through the calibrated orifice of the partition contributes to stabilizing the servo control and to damping oscillations of the valve needle.

In addition, the permanent communication between the two cavities via the calibrated orifice makes it possible to use volatile liquids insofar as vapor pressure in both cavities is identical because of the permanent communication therebetween.

By using an assembly which is purely mechanical and has seals that are static only without any plastomer or elastomer gaskets, it is possible to accept fluids that are highly corrosive.

While consuming very little gas, the low gas flow rate which is permanently maintained towards the outside prevents any risk of the valve needle hammering the valve seat.

Given the very concept of accumulating liquid, the total mass of the parts used for regulating the liquid level remains low compared with the mass of the tank which may be of very large capacity.

Advantageously, the extended portion of the partition is in the form of a tube extending perpendicularly to the liquid surface and the opening provided through the extended portion in the liquid level control zone comprises at least one narrow slot whose long sides extend along generator lines of the tube and which contributes to defining a low gain regulation system.

In a first embodiment, the gas bleeder device has a subsonic throat defined by the valve seat and the valve member.

In another embodiment, the gas bleeder device has a sonic throat defined by the valve seat and the valve member. This makes it possible to make the system largely independent of external conditions.

The moving comparator element may be constituted by a piston or by a membrane such as a bellows.

In a particular embodiment, the said adjustment means for adjusting the position in translation of the comparator element to which the valve member of the gas bleeder device is connected for the purpose of adjusting the differential pressure applied to said comparator element and for adjusting the open position of the valve member relative to the valve seat comprises a spring acting on the comparator elements and a screw co-operating with a nut fixed to the wall of the vessel in order to act on said spring and having a control head accessible from outside the vessel.

The adjustment device serves in particular to adjust the position of the mean liquid level relative to the control opening provided through the partition separating the two cavities.

The opening provided through the extended portion in the form of a tube may comprise a plurality of narrow same-height slots distributed around said tube and having their long sides extending substantially along generator lines of the tube. The presence of a plurality of slots constituting the opening situated in the liquid level control zone serves to increase accuracy and to improve tolerance to the liquid surface slopping about.

The accumulator may also include a pneumatic damper member fixed to the shaft of the gas bleeder device valve member and exerting its effect in one of the first and second cavities containing the gas.

In this case, in a particular embodiment, the said pneumatic damper member comprises a bellows membrane mounted between the wall of the vessel and a plate to which both the moving comparator elements and the control shaft of the bleeder device valve member are mounted, and a communication hole is provided through the said plate between the second cavity and the space inside the bellows membrane.

In another particular embodiment, the said pneumatic damper member comprises a fixed partition provided with a hole allowing the shaft of the valve member to pass therethrough with clearance and providing communication with the second cavity, said fixed partition constituting a portion of said separating partition between the first and second cavities, a moving partition to which both the valve member control shaft and a first end of the comparator member constituted by a bellows membrane are fixed, with the second end of the bellows membrane being attached to the said fixed partition.

The presence of a pneumatic damper member makes it possible to reduce the sensitivity of the regulation system to ambient vibration, given the main vibratory conditions observed.

BRIEF DESCRIPTION OF THE DRAWINGS

Embodiments of the invention are described by way of example with reference to the accompanying drawings, in which:

FIG. 4 is a diagrammatic vertical section through a liquid accumulator of the invention constituting a variant of the FIG. 3 embodiment and including damping means that do not require an additional bellows to be used; and FIG. 5 is a diagrammatic vertical section through a liquid accumulator analogous to the embodiment shown in FIG. 1 but in which the parts constituting the regulation system are disposed vertically instead of horizontally.

DETAILED DESCRIPTION

Figure 1:
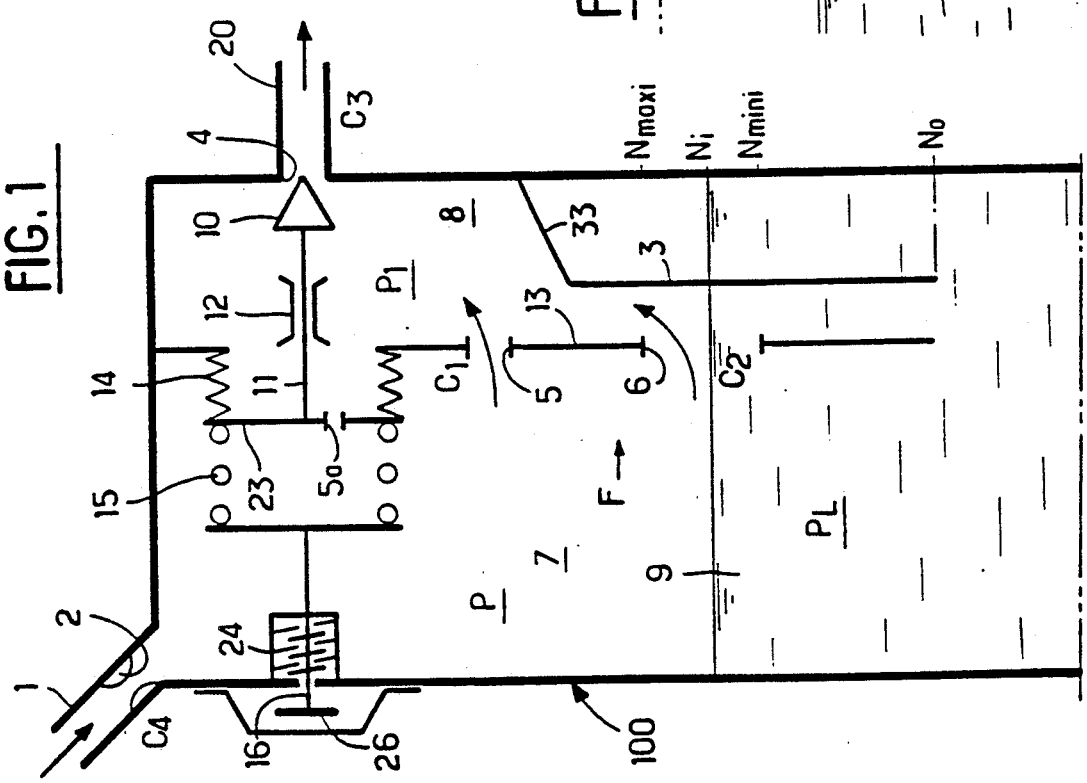
FIG. 1 is a diagrammatic vertical section through a regulated level liquid accumulator in accordance with a first embodiment of the invention.

With reference to FIG. 1, a liquid accumulator comprises a vessel 100 which is in communication with a hydraulic installation (not shown) whose characteristics may be highly diverse. The bottom portion of the space inside the vessel 100 is occupied by a liquid 9 whose free surface is situated at a level Ni which is to be regulated and which may fluctuate between a minimum level Nmin and a maximum level Nmax. The space situated inside the vessel 10 above the free surface of the liquid 9 is occupied by a gas under pressure which is inserted via a gas injector device 1, 2 disposed at a level higher than the maximum level Nmax which the liquid 9 can reach. The gas injector device comprises a gas inlet duct 1 for admitting gas at a pressure greater than the pressure inside the vessel 100, and a calibrated orifice 2 for defining a calibrated flow section 2 for the gas entering the vessel 100, thereby quantifying the gas inserted into the vessel.

The top portion of the tank defined by the vessel 100 is divided into a first cavity 7 and a second cavity 8 which are separated by a set of items 13, 23, 33 constituting a partition.

At least one calibrated orifice 5, 5a is provided through a zone of the partition 13, 23, 33 which is not in danger of being submerged, i.e. which is situated above the level Nmax.

The partition 13, 23, 33 is extended downwards by a tubular portion 3 which is substantially perpendicular to the liquid surface 9 and which extends downwards into the liquid to a level No situated well below the minimum level Nmin to which the liquid may drop.

Figure 2:
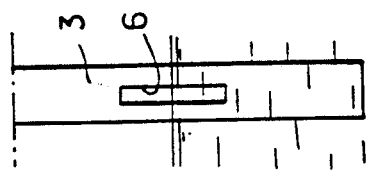
FIG. 2 is a fragmentary view seen along arrow F of FIG. 1.

The tubular portion 3 constituting the extension of the separating partitions 13, 23, 33 has an opening 6 in the liquid level control zone. The opening 6 comprises at least one narrow slot, e.g. rectangular in shape, having its long sides directed along generator lines of the tube 3 (FIG. 2). The use of a narrow vertical slot contributes to defining a low gain regulation system. The opening 6 may comprise a plurality of slots distributed around the periphery of the tube 3. In this case, accuracy is increased and tolerance to the liquid slopping about is also improved. It may be observed that the slot(s) defining the opening 6 may vary in width, should that be appropriate for satisfying special conditions required by the servo control.

The opening 6 extends on either side of the level Ni to be regulated and which constitutes the interface between the liquid and the gas under pressure. The height of the opening 6 extends preferably slightly beyond the minimum and maximum levels Nmin and Nmax that may be reached by the liquid 9.

The liquid accumulator of the invention having a regulated liquid level further comprises a device 4, 10, 20 for bleeding off the gas present in the vessel 10. This gas bleeder device 4, 10, 20 comprises a calibrated orifice 4 constituted by a valve seat which is disposed in a portion of the vessel 100 which delimits the second cavity 8. The orifice 4 opens out into a duct 20 for exhausting gas to the outside of the vessel 100.

The flow section through the gas bleeder device is defined by the valve 10 which is in the form of a valve needle that partially closes the orifice, with a control rod 11 that is guided to move in translation by fixed guides 12 and is connected at its rear end to a moving comparator element 14, 23 which constitutes a portion of the partition 13, 23, 33 separating the cavities 7 and 8 and which responds to the pressure difference $P - P_1$ existing between the cavities 7 and 8.

The rate at which gas is injected through the orifice 2 is approximately constant.

The calibrated orifice 5, 5a provided in a zone 13, 23 of the partition separating the cavities 7 and 8 that is not in danger of being submerged provides constant communication between the two cavities 7 and 8.

The section of the orifice 6 disposed in the liquid level control zone increases when the liquid level falls and decreases when the liquid level rises.

The pressure difference across the notional orifice equivalent to the orifices 5, 5a, and 6 disposed in parallel appears across the moving comparator element 14, 23 and changes the position of the valve needle 10 in such a manner that the flow section through the gas bleeder device 4, 10, 20 increases when the level Ni of the liquid 6 falls and decreases when the level of the liquid 9 rises.

Under normal operating conditions for the liquid level regulator, the valve needle 10 never comes into contact with its seat 4 and there is a permanent small flow of gas to the outside.

The comparator element 23, 14 may be constituted by a membrane in the form of a bellows 14 or by any other type of low (but non-zero) stiffness membrane having one end attached to fixed portions of the partition 13 and having its other end attached to a moving portion 23 of the partition which is fixed to the rear end of the control rod 11 for the valve needle 10. As can be seen in FIG. 1, a calibrated orifice 5a of fixed section ensures that gas may flow between the cavities 6 and 8 directly through the moving partition 23.

A device is provided for adjusting the position in translation of the moving equipment constituted by the comparator element 14, 23, the control rod 11, and the valve needle 10.

This adjustment device is essentially constituted by a spring 15 of adjustable deflection which exerts force on the comparator element 14, 23. The spring 15 may act in positive or negative manner on the bellows 14. The tension of the spring 15 is adjusted by a screw 16 whose head 26 is accessible from outside the vessel 100 and which co-operates with a nut 24 fixed to the wall of the vessel 100.

The screw 16 serves to establish an adjustment term Pr equal to the difference between the pressures P and P1 existing in the cavities 7 and 8. The screw 16 serves to adjust the maximum flow section through the outlet orifice 4 by acting on the control rod 11 of the valve needle 10 via the spring 15 and the bellows 14 connected in series. The maximum flow section through the outlet orifice 4 corresponds to a zero value for the adjustment term Pr set by the spring 15. The screw 16 serves to vary the adjustment term Pr between a zero value and a maximum value.

When in equilibrium, i.e. when the liquid has reached the required level and is stable, the gas flow rate through the calibrated inlet orifice 2 is equal to the sum of the flow rates through the opening 6 and the calibrated orifice(s) 5, 5a. The gas flow rate through the outlet orifice 4 also remains equal to the flow rate through the calibrated inlet orifice 2.

In the absence of gas and liquid, i.e. in ambient air, the valve needle 10 is offset very slightly from the equilibrium position it adopts in operation. This small offset corresponds to the adjustment term.

The small pressure difference between the cavities 7 and 8 which is adjustable by means of the screw 16 has the advantage of giving rise to a low bleed speed at the level of the free surface. As a result, the surface is deformed little, thereby improving accuracy, and the danger of excessive two-phase bleeding (liquid and gas) is eliminated. By having a pressure difference between the cavities 7 and 8 which remains low, it is possible to operate over a wide range of absolute pressures.

The ejection of gas to the outside takes place through a throat 4 which is subsonic. However, the throat 4 via which the gas is ejected to the outside could be sonic providing the pressure outside the vessel 100 is less than one-half of the pressure inside the vessel in the cavity 8. In this case, the liquid level regulation system is unaffected by the fluid conditions that exist in the place to which the gas is exhausted.

It may be observed that the device of the invention includes its own means for measuring liquid level that are mechanical, and that it does not require any other type of measurement means to be added, e.g. means that are electrical in nature.

Consequently, the liquid accumulator of the invention has the advantage of being accurate even under high pressure, and if a sonic gas exhaust throat 4 is used, it also has the advantage of being independent of the place to which the gas is exhausted.

The strictly mechanical nature of the items constituting the level regulation system makes it suitable for use in aggressive environments, while making adjustment easy and being very compact compared with the entire hydraulic accumulator assembly in which the liquid level is to be regulated.

The existence of a permanent flow of gas reduces the danger of repeated shocks between the valve needle 10 and the valve seat 4 constituting the outlet orifice, and thus reduces the risk of the valve seat 4 being hammered which could give rise to an undesirable change in the flow section between the seat and the needle 10.

Figure 3:
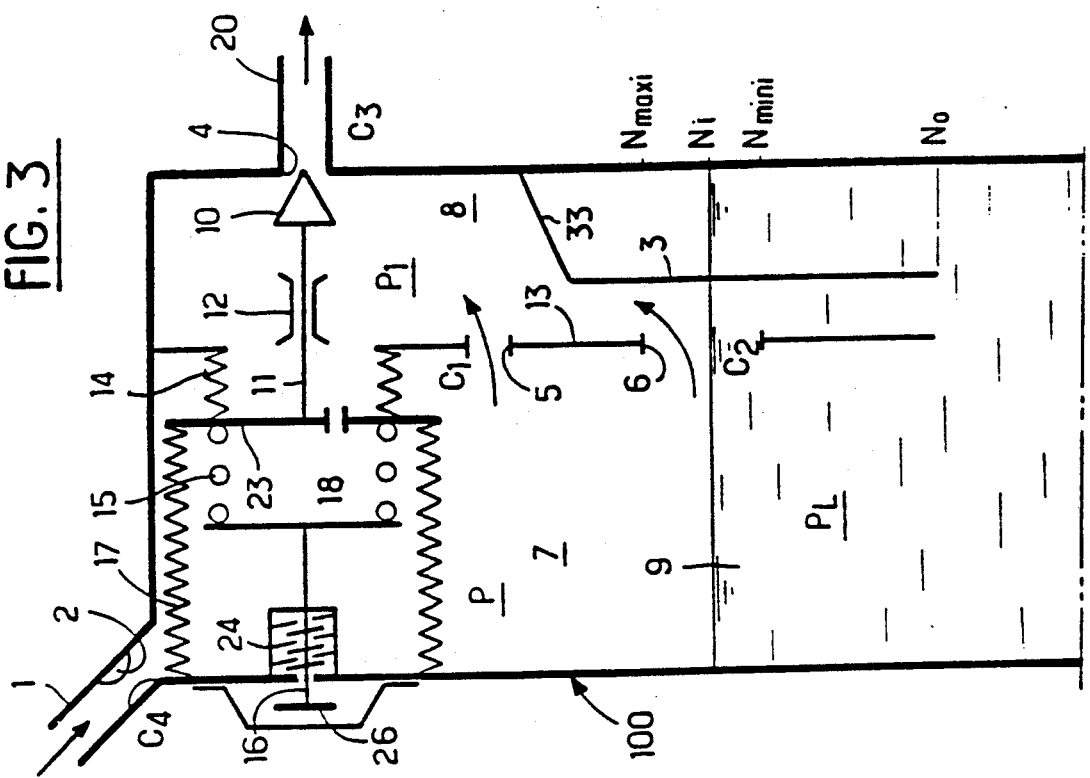
FIG. 3 is a diagrammatic vertical section through a liquid accumulator of the invention similar to the embodiment of FIG. 1 but provided with an additional bellows for setting up a damping effect.

It may also be observed that in the embodiment of FIG 1, as in the other embodiments shown in FIGS. 3 to 5, all sealing is static.

In the device of the invention, gas consumption remains low and accurate servo control may be obtained because of the substantially linear law relating the flow rate of the exhaust gas to the pressure difference between the two cavities 7 and 8. The servo control may have a wide passband, e.g. 100 Hz or more.

The permanent flow of gas passing through the calibrated orifice 5, 5a ensures stability to the servo control and damps oscillations of the valve needle 10.

The accumulator of the invention may be used with volatile liquids insofar as vapor pressure in both cavities 7 and 8 is identical because of the permanent communication established between the cavities 7 and 8 by the calibrated orifice 5, 5a.

FIG. 3 shows a variant of the liquid accumulator embodiment shown in FIGS. 1 and 2. In FIG. 3, items similar to those of the accumulator in FIGS. 1 and 2 are given the same references and are not described again. The liquid level regulation system incorporated in the FIG. 3 accumulator includes a damper device for damping movements of the valve needle 10. This damper device comprises a second bellows 17 surrounding the screw 16 and the spring 15 and fixed at one end to the wall of the vessel 100 and at its other end to a portion of the moving partition 23 to which the bellows 14 and the needle control rod 11 are also fixed. A small orifice 18 through the moving partition 23 provides gas communication between the cavity 8 and a third cavity defined by the space inside the second bellows 17, thereby constituting a pneumatic damper device fixed to the needle control rod 11. The presence of a damper device contributes to reducing the sensitivity of the regulation system to ambient vibration, taking account of the main vibration conditions observed.

FIG. 4 shows a variant of the liquid accumulator embodiment shown in FIGS. 1 and 2, in which a damper device is provided for damping the movements of the valve needle 10 while using one bellows only.

As can be seen in FIG. 4, the control rod 11 for the valve needle 10 passes with clearance 19 through a portion of the fixed partition 25 contributing to defining the cavities 7 and 8. The clearance 19 allows gas communication to take place between the cavity 8 and a third cavity defined by the space inside the bellows 14. The end of the bellows 14 which is not attached to the fixed partition 25 is closed by a moving partition 23 having no gas exhaust orifice and having pressure exerted thereon by the spring 15 which is disposed in the cavity 7. The ingress of gas from the cavity 8 into the small additional cavity delimited by the bellows 14 and the moving partition 23 closing the bellows 14 and controlling the control rod 11 of the valve needle 10 serves to damp the movements of the needle 10 as in the FIG. 3 embodiment, but without requiring an additional bellows over the FIG. 1 embodiment.

FIG. 5 shows a liquid accumulator fixed with a liquid level regulator which operates in exactly the same way as that of FIG. 1. However, some of its parts are disposed rather differently from the corresponding parts shown in FIG. 1. Thus, in FIG. 1 the control rod 11 for the valve needle 10, the bellows 14, the spring 15, and the adjustment screw 16 are disposed horizontally across the top portion of the vessel 100 and beneath the calibrated gas-injection orifice 2 which is situated at the very top of the vessel.

In contrast, in FIG. 5, the needle control rod 11, the bellows 14, the spring 15, and the adjustment screw 16 are disposed vertically at the top of the vessel 100 inside a bell-forming compartment 102 mounted on a base which is constituted by the top horizontal wall of a base tank 101 which may be a conventional large capacity tank and which together with the bell 102 constitutes the vessel 100. The embodiment of FIG. 5 makes it easy to fit a liquid level regulation system of the invention to a conventional liquid accumulator 101.

The device 1, 2 for injecting gas under pressure into the base tank 101 is disposed at the top of the base tank 101, e.g. through its top horizontal wall, and it serves to inject gas into a first cavity 7 which is constituted by the top portion of the base tank 101 situated above the liquid level Ni, and extending inside the bell 102 via a communicating opening 103.

The gas bleeder device 4, 10, 20 is placed in a bottom block 133 of the bell 102 which rests on the horizontal top wall of the base tank 101, and it is extended by a tubular portion 3 dipping into the liquid 9 down to a level No situated below the minimum level to which the liquid may drop.

The moving needle 10 which co-operates with the valve seat 4 fixed to the bottom block 133 is situated at the end of a control rod 11 guided to move in translation between two fixed guides 12 attached to the bottom block 133. The top end of the control rod 11 is mounted on a horizontal plate 23 forming a moving partition on which a spring 15 acts with the spring pressure Pr being itself preadjusted by means of a translation adjustment system 16 disposed vertically and accessible from outside the bell 102. A bellows 14 is fixed at one of its ends to the moving partition 23 and at its other end to the bottom block 133 and it surrounds the control rod 11. A calibrated orifice 5 is provided through the moving partition 23 in order to allow a constant flow of gas from the cavity 7 into the cavity 8 as delimited by the moving partition 23, the bellows 14, the tube 3, and the bottom block 133. Narrow slots 6 are disposed vertically through the tube 3 in the liquid level control zone on either side of the liquid gas interface at level Ni, as explained with reference to FIGS. 1 to 4. Communication between the cavity 7 which extends both inside the top portion of the tank 101 and inside part of the bell 102, and the cavity 8 delimited by the bellows 14, the partitions 23, 13, 133, and the tube 3, thus takes place firstly via the calibrated orifice 5 through the moving partition 23 and secondly via the slots 6 in the tube 3 which define an opening of variable section, as described above.

I claim:

1. A liquid accumulator for liquid under high pressure and at regulated level, the accumulator comprising a vessel which is in communication with a hydraulic circuit and which contains a liquid occupying a portion of the space inside the vessel, a gas injector device for injecting gas under pressure into the vessel, and a gas bleeder device for bleeding off gas present in the vessel, said bleeder device having a flow section whose value increases when the liquid level inside the vessel drops and decreases when the liquid level inside the vessel rises, wherein:

the top portion of the space inside the vessel is subdivided into first and second cavities by a partition having at least one calibrated orifice provided through a zone of the partition which is not in danger of being submerged;

said partition is extended by a portion substantially perpendicular to the surface of the liquid and extending downwards into the liquid to a level No situated well below the minimum level to which the liquid may drop;

the extended portion of the separating partition possesses an opening in the liquid level control zone, the opening extending on either side of the level interface Ni between the liquid and the gas under pressure;

the accumulator includes means for maintaining the flow rate of the gas injected into the vessel by the pressurized gas injector device substantially constant;

the gas bleeder device comprises a valve seat co-operating with a valve member in the form of a needle whose position is adjusted by a moving comparator element constituting a portion of the partition and responding to the pressure difference P−P1 existing between the first and second cavities; and adjustment means are associated with the moving comparator element so as to ensure that under normal operating conditions for regulating the level of the liquid the valve member never comes into contact with its seat, thereby permanently maintaining a small flow of gas to the outside.

2. A liquid accumulator according to claim 1, wherein the extended portion of the partition is in the form of a tube extending perpendicularly to the liquid surface, and wherein the opening provided through the extended portion in the liquid level control zone comprises at least one narrow slot whose long sides extend along generator lines of the tube and which contributes to defining a low gain regulation system.

3. A liquid accumulator according to claim 1, wherein the gas bleeder device has a subsonic throat defined by the valve seat and the valve member.

4. A liquid accumulator according to claim 1, wherein the gas bleeder device has a sonic throat defined by the valve seat and the valve member.

5. A liquid accumulator according to claim 1, wherein the moving comparator element is constituted by a membrane such as a bellows.

6. A liquid accumulator according to claim 1, wherein the moving comparator element is constituted by a piston.

7. A liquid accumulator according to claim 1, wherein the said adjustment means for adjusting the position in translation of the comparator element to which the valve member of the gas bleeder device is connected for the purpose of adjusting the differential pressure applied to said comparator element and for adjusting the open position of the valve member relative to the valve seat comprises a spring acting on the comparator elements and a screw co-operating with a nut fixed to the wall of the vessel in order to act on said spring and having a control head accessible from outside the vessel.

8. A liquid accumulator according to claim 2, wherein the opening provided through the extended portion in the form of a tube comprises a plurality of narrow same-height slots distributed around said tube and having their long sides extending substantially along generator lines of the tube.

9. A liquid accumulator according to claim 1, further comprising a pneumatic damper member fixed to the shaft of the gas bleeder device valve member and exerting its effect in one of the first and second cavities containing the gas.

10. A liquid accumulator according to claim 9, wherein the said pneumatic damper member comprises a bellows membrane mounted between the wall of the vessel and a plate to which both the moving comparator elements and the control shaft of the bleeder device valve member are mounted, and wherein a communication hole is provided through the said plate between the second cavity and the space inside the bellows membrane.

11. A liquid accumulator according to claim 9, wherein the said pneumatic damper member comprises a fixed partition provided with a hole allowing the shaft of the valve member to pass therethrough with clearance and providing communication with the second cavity, said fixed partition constituting a portion of said separating partition between the first and second cavities, a moving partition to which both the valve member control shaft and a first end of the comparator member constituted by a bellows membrane are fixed, with the second end of the bellows membrane being attached to the said fixed partition.

12. A liquid accumulator according to claim 1, wherein the extended portion of the partition is in the form of a tube perpendicular to the surface of the liquid and wherein the opening through the extended portion in the liquid level control zone comprises at least one narrow vertical slot of varying width.

* * * * *